United States Patent
Porras et al.

(10) Patent No.: US 9,631,547 B2
(45) Date of Patent: Apr. 25, 2017

(54) PHEV HEATING MODES TO PROVIDE CABIN COMFORT

(71) Applicant: Ford Global Technologies, LLC, Dearborn, MI (US)

(72) Inventors: Angel Fernando Porras, Dearborn, MI (US); William David Treharne, Ypsilanti, MI (US); Paul Stephen Bryan, Belleville, MI (US); Scott James Thompson, Waterford, MI (US); Wesley Burkman, Melvindale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 736 days.

(21) Appl. No.: 13/787,880

(22) Filed: Mar. 7, 2013

(65) Prior Publication Data

US 2014/0109872 A1 Apr. 24, 2014

Related U.S. Application Data

(60) Provisional application No. 61/716,075, filed on Oct. 19, 2012.

(51) Int. Cl.
*F02B 77/00* (2006.01)
*F01P 7/16* (2006.01)
*B60H 1/03* (2006.01)

(52) U.S. Cl.
CPC .............. *F01P 7/165* (2013.01); *B60H 1/034* (2013.01); *F01P 2025/12* (2013.01);
(Continued)

(58) Field of Classification Search
CPC ....... F02B 77/00; F01P 2060/08; F01P 7/165; F01P 2050/24; F01P 3/20; F01P 7/167;
(Continued)

(56) References Cited

U.S. PATENT DOCUMENTS 3,626,148 A * 12/1971 Woytowich ............. F02N 19/10
123/142.5 E
4,520,258 A * 5/1985 Grohmann ......... B60H 1/00814
165/41

(Continued)

FOREIGN PATENT DOCUMENTS

CN 102101426 A 6/2011

OTHER PUBLICATIONS

Chinese Patent Office, First Office Action for the corresponding Chinese Patent Application No. 201310491903.X, mailed Aug. 3, 2016.

*Primary Examiner* — Hung Q Nguyen
*Assistant Examiner* — John Bailey
(74) *Attorney, Agent, or Firm* — David Kelley; Brooks Kushman P.C.

(57) ABSTRACT

A vehicle is disclosed that has multiple coolant paths selected by control of a valve. A valve system is configured to direct coolant from an engine to a heat exchanger according to a difference between a temperature associated with the engine and a temperature associated with the heat exchanger. The valve system is also configured to direct coolant from the engine to an electric heater and to, in response to a heat demanded from the heat exchanger being greater than a heat capability of the electric heater, request the engine to run. A method is disclosed for controlling a valve to change from an isolation position in which the valve isolates coolant circulating through an electric heater and the valve from coolant circulating through an engine to a non-isolation position in which the valve directs coolant from the engine to the electric heater.

9 Claims, 3 Drawing Sheets

(52) U.S. Cl.
CPC ....... *F01P 2025/30* (2013.01); *F01P 2060/08* (2013.01); *F01P 2060/18* (2013.01)

(58) Field of Classification Search
CPC ........... F01P 2005/105; F01P 2007/146; F01P 2070/04; F01P 2005/125; F01P 2025/08; F01P 2025/32; F01P 2060/18; F01P 7/14; F01P 7/16; F01P 2025/13; F01P 2025/30; F01P 7/08; F01P 7/162; B60H 1/00885; B60H 1/08; B60H 1/12; B60H 1/004; B60H 1/2221; B60H 1/2225
USPC .......... 123/25 K, 41.48, 41.01, 41.02, 41.05, 123/41.08, 41.1, 41.11, 41.12, 41.23, 123/41.25, 41.29, 41.31, 41.3, 41.34, 123/41.44, 41.51, 339.18, 697, 549, 123/142.5 R, 142.5 E, 435, 142.5; 237/12.3 B; 180/65.2, 65.245; 219/202, 219/208
See application file for complete search history.

(56) References Cited

U.S. PATENT DOCUMENTS

| | | | | |
|---|---|---|---|---|
| 4,591,691 A * | 5/1986 | Badali | ................... | B60H 1/034 123/142.5 E |
| 4,605,163 A * | 8/1986 | Hayashi | ................... | B60H 1/04 123/41.08 |
| 4,744,335 A * | 5/1988 | Miller | ................... | F01P 7/167 123/41.08 |
| 4,744,336 A * | 5/1988 | Miller | ................... | F01P 7/167 123/41.08 |
| 5,012,070 A * | 4/1991 | Reed | ................... | B60R 16/04 219/202 |
| 5,048,752 A * | 9/1991 | Hintennach | ........... | B60H 1/032 123/142.5 R |
| 5,549,153 A * | 8/1996 | Baruschke | ........ | B60H 1/00278 165/42 |
| 5,624,003 A * | 4/1997 | Matsuki | ............. | B60H 1/00278 180/65.1 |
| 5,678,760 A * | 10/1997 | Muso | ................... | B60K 11/02 165/41 |
| 5,725,048 A * | 3/1998 | Burk | ................... | B60H 1/034 165/236 |
| 5,752,655 A * | 5/1998 | Kodama | ............. | B60H 1/2206 237/12.3 B |
| 6,010,076 A * | 1/2000 | Winik | ................... | B60H 1/034 123/142.5 R |
| 6,032,869 A * | 3/2000 | Ito | ................... | B60H 1/00314 165/103 |
| 6,105,876 A * | 8/2000 | Hennrich | ........... | B60H 1/00485 237/12.3 B |
| 6,178,292 B1 * | 1/2001 | Fukuoka | ................. | F24H 1/009 165/175 |
| 6,213,233 B1 * | 4/2001 | Sonntag | ................. | B60H 1/004 123/142.5 R |
| 6,270,015 B1 * | 8/2001 | Hirota | ................. | B60H 1/00478 237/12.3 B |
| 6,595,165 B2 * | 7/2003 | Fishman | ................. | F01P 7/167 123/41.1 |
| 6,598,671 B1 * | 7/2003 | Zeng | ................... | B60H 1/00735 165/202 |
| 6,601,545 B1 * | 8/2003 | Hohl | ........................ | B60H 1/03 123/41.31 |
| 6,607,142 B1 * | 8/2003 | Boggs | ..................... | B60K 6/22 180/65.1 |
| 6,616,059 B2 * | 9/2003 | Sabhapathy | ............. | B60H 1/04 123/142.5 E |
| 6,713,729 B2 * | 3/2004 | Takeo | ................ | B60H 1/00428 219/485 |
| 6,786,191 B2 * | 9/2004 | Foster | ................. | B60H 1/00314 123/198 F |
| 7,380,586 B2 * | 6/2008 | Gawthrop | ............. | B60H 1/004 165/202 |
| 7,591,143 B2 * | 9/2009 | Zeigler | ............. | B60H 1/00378 162/202 |
| 7,591,303 B2 * | 9/2009 | Zeigler | ............. | B60H 1/00378 165/271 |
| 7,870,892 B2 * | 1/2011 | Gawthrop | ............. | B60H 1/004 165/202 |
| 8,402,776 B2 * | 3/2013 | Johnston | ............... | B60L 3/0046 62/513 |
| 8,540,166 B2 * | 9/2013 | Nemoto | ............. | B60H 1/00764 123/41.11 |
| 8,689,741 B2 * | 4/2014 | Park | ..................... | B60H 1/00778 123/41.05 |
| 2002/0053325 A1 * | 5/2002 | Fishman | ................. | F01P 7/167 123/41.1 |
| 2002/0096130 A1 * | 7/2002 | Fishman | ................. | F01P 7/167 123/41.1 |
| 2003/0127528 A1 * | 7/2003 | Sabhapathy | ............. | B60H 1/04 237/12.3 B |
| 2003/0172667 A1 * | 9/2003 | Takano | ................ | B60H 1/3208 62/202 |
| 2004/0031452 A1 * | 2/2004 | Yamazaki | ................ | B60K 6/24 123/41.05 |
| 2006/0272605 A1 * | 12/2006 | Wright | ..................... | F02N 19/10 123/142.5 E |
| 2008/0061158 A1 * | 3/2008 | Nakagawa | ............ | F24D 11/005 237/12.1 |
| 2009/0179080 A1 * | 7/2009 | Alston | ................ | B60H 1/00378 237/28 |
| 2009/0283604 A1 * | 11/2009 | Martinchick | ...... | B60H 1/00392 237/12.3 B |
| 2009/0308335 A1 * | 12/2009 | Dipaola | ................... | F01P 7/165 123/41.1 |
| 2010/0186685 A1 * | 7/2010 | Hiyama | ............. | B60H 1/00314 123/41.08 |
| 2011/0107773 A1 * | 5/2011 | Gawthrop | ............. | B60H 1/004 62/3.61 |
| 2012/0118988 A1 * | 5/2012 | Lee | ........................ | B60H 1/143 237/12.3 R |
| 2012/0168118 A1 * | 7/2012 | Myers | ..................... | B60L 11/14 165/51 |
| 2012/0168138 A1 * | 7/2012 | Myers | ..................... | F02B 29/0475 165/200 |
| 2012/0216983 A1 * | 8/2012 | Bennion | ............ | B60H 1/00907 165/41 |

* cited by examiner

PHEV HEATING MODES TO PROVIDE CABIN COMFORT

CROSS-REFERENCE TO RELATED APPLICATIONS

This application claims the benefit of U.S. Provisional Application No. 61/716,075, filed Oct. 19, 2012, the disclosure of which is incorporated in its entirety by reference herein.

BACKGROUND

To provide passenger compartment comfort, vehicles have the capability to heat or cool the passenger compartment. Conventional vehicles use waste heat from the engine as the sole source of heating for the passenger compartment. With the advent of Battery Electric Vehicles (BEV), there is no longer any waste heat available so that other means of heating the passenger compartment are required. A typical BEV may use an electric heater to warm the passenger compartment. Similarly, Hybrid Electric Vehicles (HEV) pose different problems because the engine may not always be running and generating waste heat for use by the heating system. Plug-in Hybrid Electric Vehicles (PHEV) compound this issue by running with the engine off for significant periods of time. In order to provide optimal fuel economy benefits, it is desired to heat the passenger compartment without having to rely solely on engine waste heat.

SUMMARY

In an illustrative embodiment, a hybrid vehicle includes an engine, an electric heater, a heater core and a valve arranged to route coolant through at least one of the engine and the electric heater. The illustrative system also includes a controller configured to request the engine to be started and to control a valve to route coolant through the engine and the heater core in response to a heat request. The illustrative system includes the capability to run an electric heater and electric heating loop independent from the engine and radiator loops by controlling the valve and electric heater. The illustrative system may provide robust capability to provide heating despite the fault of some of the system components. The illustrative system may also provide modes of operation to improve the effectiveness of heating the passenger compartment.

An embodiment of a vehicle is disclosed comprising an engine, a heat exchanger or heater core, an electric heater, and a valve system configured to direct coolant from the engine to the heat exchanger according to a difference between a temperature associated with the engine and a temperature associated with the heat exchanger. The temperature associated with the engine may be the temperature of the coolant exiting the engine. The temperature associated with the heat exchanger may be the temperature of the coolant exiting the heat exchanger. The valve system may be further configured to direct coolant from the engine to the electric heater according to the difference between the temperature associated with the heat exchanger and the temperature associated with the engine. The valve system may direct coolant from the engine to the heat exchanger in response to the difference between the temperature associated with the engine and the temperature associated with the heat exchanger being greater than a predetermined threshold. The electric heater may be further configured to heat fluid according to the difference between the temperature associated with the engine and the temperature associated with the heat exchanger.

Another embodiment of a vehicle is disclosed comprising an engine, a heat exchanger, an electric heater, and a valve system configured to direct coolant from the engine to the electric heater and to, in response to a heat demanded from the heat exchanger being greater than a heat capability of the electric heater, request the engine to run. The valve system may be further configured to direct coolant from the engine to the electric heater according to a difference between a temperature associated with the engine and a temperature associated with the heat exchanger. It may be required that the difference between the temperature associated with the engine and the temperature associated with the heat exchanger be greater than a predetermined threshold. The electric heater may be further configured to heat fluid according to a difference between a temperature associated with the engine and a temperature associated with the heat exchanger.

A method is disclosed for controlling a valve to selectively fluidly connect coolant loops in a vehicle heating system. The method comprises controlling the valve to change from an isolation position in which the valve isolates coolant circulating through an electric heater and the valve from coolant circulating through an engine to a non-isolation position in which the valve directs coolant from the engine to the electric heater in response to a difference between a temperature associated with the engine and a temperature associated with a heat exchanger being greater than a first threshold or in response to a difference between a heat demanded from the heat exchanger and a heat capability of the electric heater being greater than a second threshold. The method may further comprise requesting the engine to run in response to the difference between the heat demanded from the heat exchanger and the heat capability of the electric heater being greater than the second threshold. The method may further comprise controlling the valve to direct coolant from the engine to the heat exchanger in response to the electric heater being inoperative. The method may further comprise controlling the electric heater to heat the circulating coolant according to the difference between the temperature associated with the engine and the temperature associated with the heat exchanger. The temperature associated with the engine may be the temperature of the coolant exiting the engine. The temperature associated with the heat exchanger may be the temperature of the coolant exiting the heat exchanger.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may have two or more propulsion devices, such as a first propulsion device and a second propulsion device. For example, the vehicle may have an engine and an electric motor, a fuel cell and an electric motor, or other combinations of propulsion devices as are known in the art. The engine may be a compression or spark ignition internal combustion engine, or an external combustion engine, and the use of various fuels is contemplated. In one example, the vehicle is a hybrid vehicle (HEV), and additionally may have the ability to connect to an external electric grid, such as in a plug-in electric hybrid vehicle (PHEV). The PHEV structure is used in the figures and to describe the various embodiments below; however, it is contemplated that the various embodiments may be used with vehicles having other propulsion devices or combinations of propulsion devices as is known in the art.

A plug-in Hybrid Electric Vehicle (PHEV) involves an extension of existing Hybrid Electric Vehicle (HEV) technology, in which an electric battery supplements an internal combustion engine and at least one electric machine to further gain increased mileage and reduced vehicle emissions. A PHEV uses a larger capacity battery than a standard hybrid vehicle, and it adds a capability to recharge the battery from an electric power grid, which supplies energy to an electrical outlet at a charging station. This further improves the overall vehicle system operating efficiency in an electric driving mode and in a hydrocarbon/electric blended driving mode.

Figure 1:
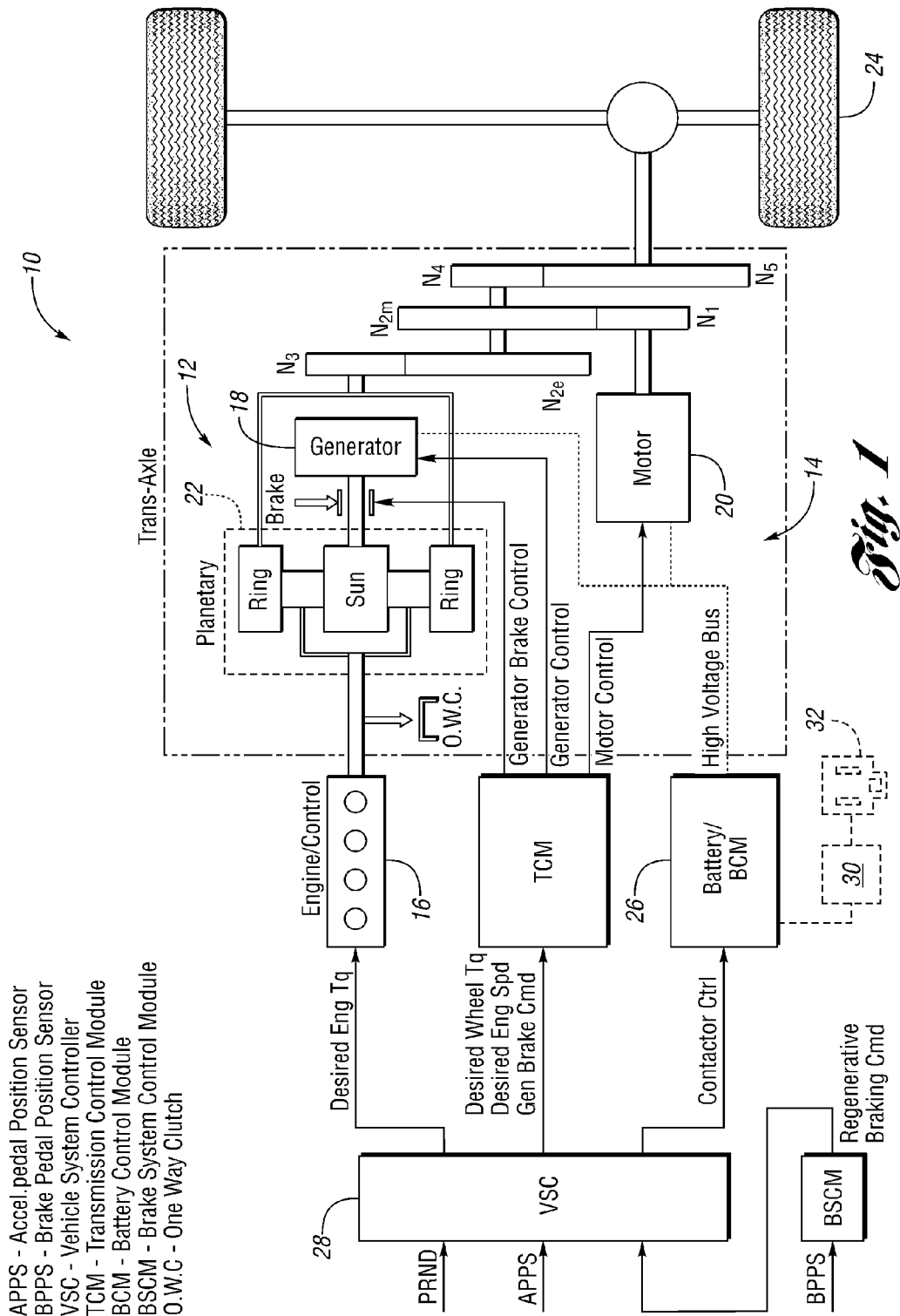
FIG. 1 is a schematic representation of a hybrid vehicle.

FIG. 1 illustrates an HEV 10 powertrain configuration and control system. A power split hybrid electric vehicle 10 may be a parallel hybrid electric vehicle. The HEV configuration as shown is for example purposes only and is not intended to be limiting as the present disclosure applies to HEVs, PHEVs, or other vehicle types of any suitable architecture. In this powertrain configuration, there are two power sources 12, 14 that are connected to the driveline, which include a combination of engine and generator subsystems using a planetary gear set to connect to each other, and the electric drive system (motor, generator, and battery subsystems). The battery subsystem is an energy storage system for the generator and the motor.

The charging generator speed will vary the engine output power split between an electrical path and a mechanical path. In a vehicle 10 with a power split powertrain system, unlike conventional vehicles, the engine 16 requires either the generator torque resulting from engine speed control or the generator brake torque to transmit its output power through both the electrical and mechanical paths (split modes) or through the all-mechanical path (parallel mode) to the drivetrain for forward motion. During operation using the second power source 14, the electric motor 20 draws power from the battery 26 and provides propulsion independently of the engine 16 for forward and reverse motions. This operating mode is called "electric drive" or electric-only mode or EV mode.

The operation of this power split powertrain system, unlike conventional powertrain systems, integrates the two power sources 12, 14 to work together seamlessly to meet the driver's demand without exceeding the system's limits (such as battery limits) while optimizing the total powertrain system efficiency and performance. Coordination control between the two power sources is needed. As shown in FIG. 1, there is a hierarchical vehicle system controller (VSC) 28 that performs the coordination control in this power split powertrain system. Under normal powertrain conditions (no subsystems/components faulted), the VSC interprets the driver's demands (e.g. PRND and acceleration or deceleration demand), and then determines the wheel torque command based on the driver demand and powertrain limits. In addition, the VSC 28 determines when and how much torque each power source needs to provide in order to meet the driver's torque demand and to achieve the operating point (torque and speed) of the engine.

The battery 26 is additionally rechargeable in a PHEV vehicle 10 configuration (shown in phantom), using a receptacle 32 which is connected to the power grid or other outside electrical power source and is coupled to battery 26, possibly through a battery charger/converter 30.

The vehicle 10 may be operated in electric mode (EV mode) in which the battery 26 provides all of the power to the electric motor 20 to operate the vehicle 10. In addition to the benefit of saving fuel, operation in EV mode may enhance the ride comfort through lower noise and better driveability, e.g., smoother electric operation, lower noise, vibration, and harshness (NVH), and faster response. Operation in EV mode also benefits the environment with zero emissions from the vehicle during this mode.

A Plug-in Hybrid Electric Vehicle (PHEV) shares characteristics of both an ICE and a BEV. A PHEV may have some driving range in which propulsion is provided only by an electric motor 20 powered from a battery pack 26. Once the battery pack 26 charge has been depleted to a certain level, the engine 16 may be started. The engine 16 may provide power to propel the vehicle and to recharge the battery pack 26. In electric only mode, the engine 16 will not be running. Since the engine 16 is not running, there will be no engine heat generated that can be used for heating the passenger compartment. A PHEV may start the engine 16 in response to a need for passenger heating. This, however, interferes with the electric only operation and may impact fuel economy and emissions.

Figure 2:
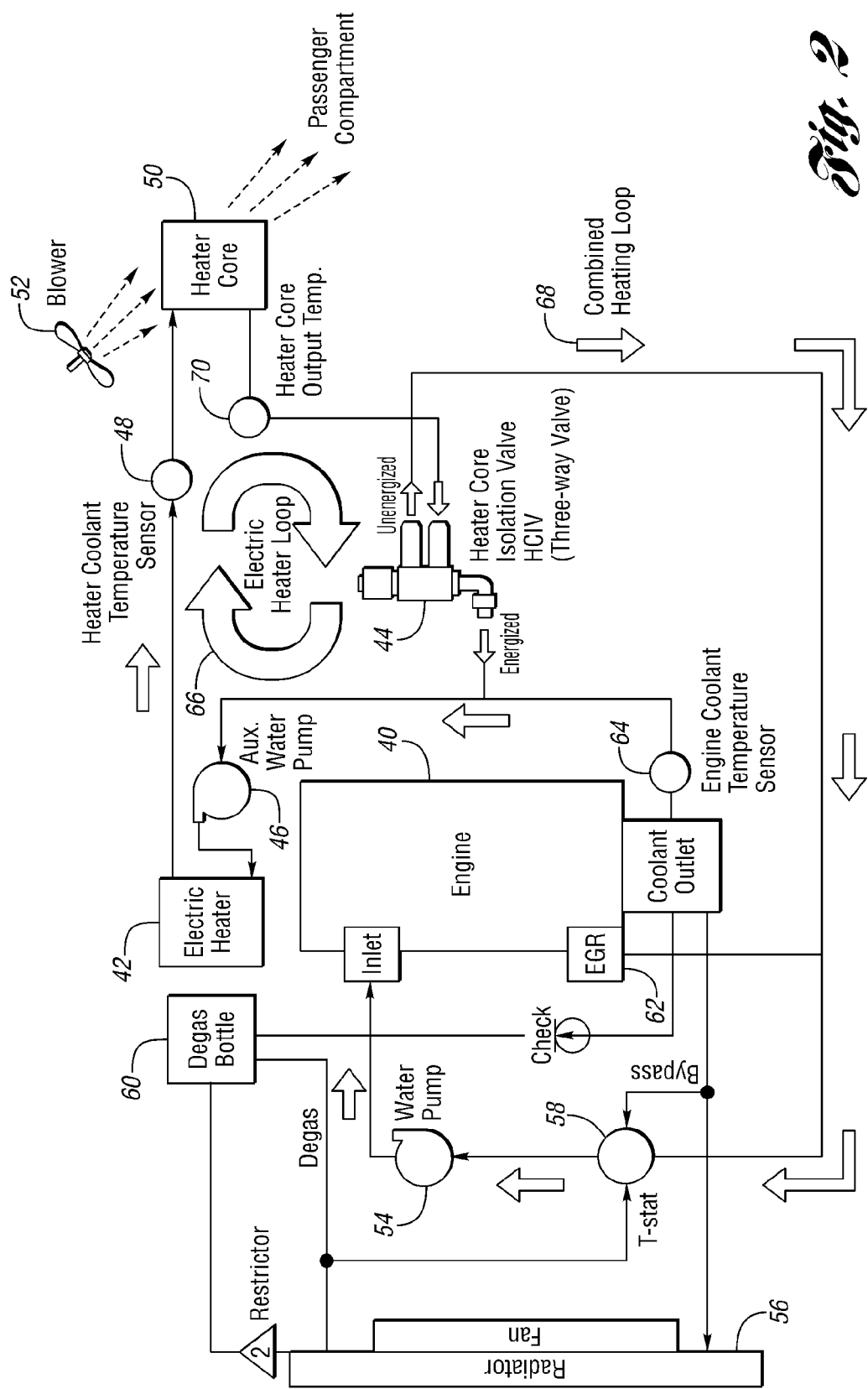
FIGS. 2 and 3 are schematic representations of vehicle components implementing climate control strategies.

One possible system for providing passenger compartment heating for a PHEV is shown in FIG. 2. The system provides two sources of coolant heating. The system may utilize heat from the engine 40 to heat the coolant as in a conventional ICE vehicle. The system may also provide heat via an electric heater 42 as in a BEV system. Having multiple sources of heat allows flexibility during normal operating conditions and some redundancy during fault modes. The system allows the coolant from the different heat sources to flow through the heater core. The addition of a Heater Core Isolation Valve (HCIV) 44 allows the passenger heater system to select the source of heated coolant. A vehicle system controller (VSC) module (28 FIG. 1) may control the operation of the system. The VSC (28 FIG. 1) may determine the heating mode based on the passenger-heating request and the status of the various components in the heating system. A desired heater core coolant temperature is generated by or provided to the VSC (28 FIG. 1). To ensure robust operation, the VSC (28 FIG. 1) may attempt to work with missing or failed control elements by choosing an appropriate operating mode. The goal of the heating system is to maintain the heater core temperature at the desired heater core coolant temperature in the most fuel efficient manner possible.

The electric heater 42 may be a positive temperature coefficient (PTC) type heater. PTC heating elements are made of small ceramic stones that have self-limiting temperature properties. These properties have fast heating response times and the ability to automatically vary its wattage to maintain a pre-defined temperature. As such, PTC heaters may be a good choice for providing controlled electrical heat to a vehicle cabin.

The system may also have an auxiliary water pump 46 to force coolant to flow through the heating system. A coolant sensor 48 may be included to measure the coolant temperature. The coolant flows through a heater core 50 that allows heat to be transferred from the coolant to air entering the passenger compartment. The heat may be transferred from the coolant in the heater core using a blower 52 to pass air over the heater core 50 and into the passenger compartment.

The system may also have a water pump 54 to force fluid to flow through the engine 40. The water pump 54 may be electrically or mechanically driven. In certain modes, the water pump 54 may force fluid through the heating components as well. The system may also have a radiator 56 to dissipate heat in the coolant. The system may also have a thermostat 58 to control the flow of coolant between the radiator 56 and the engine 40. The system may also have a degas bottle 60 that may act as a coolant reservoir, remove air from the coolant, and provide pressure relief. The cooling system may further include an exhaust gas recirculation (EGR) 62 system that recirculates a portion of the engine's exhaust gas back to the engine cylinders.

Figure 3:
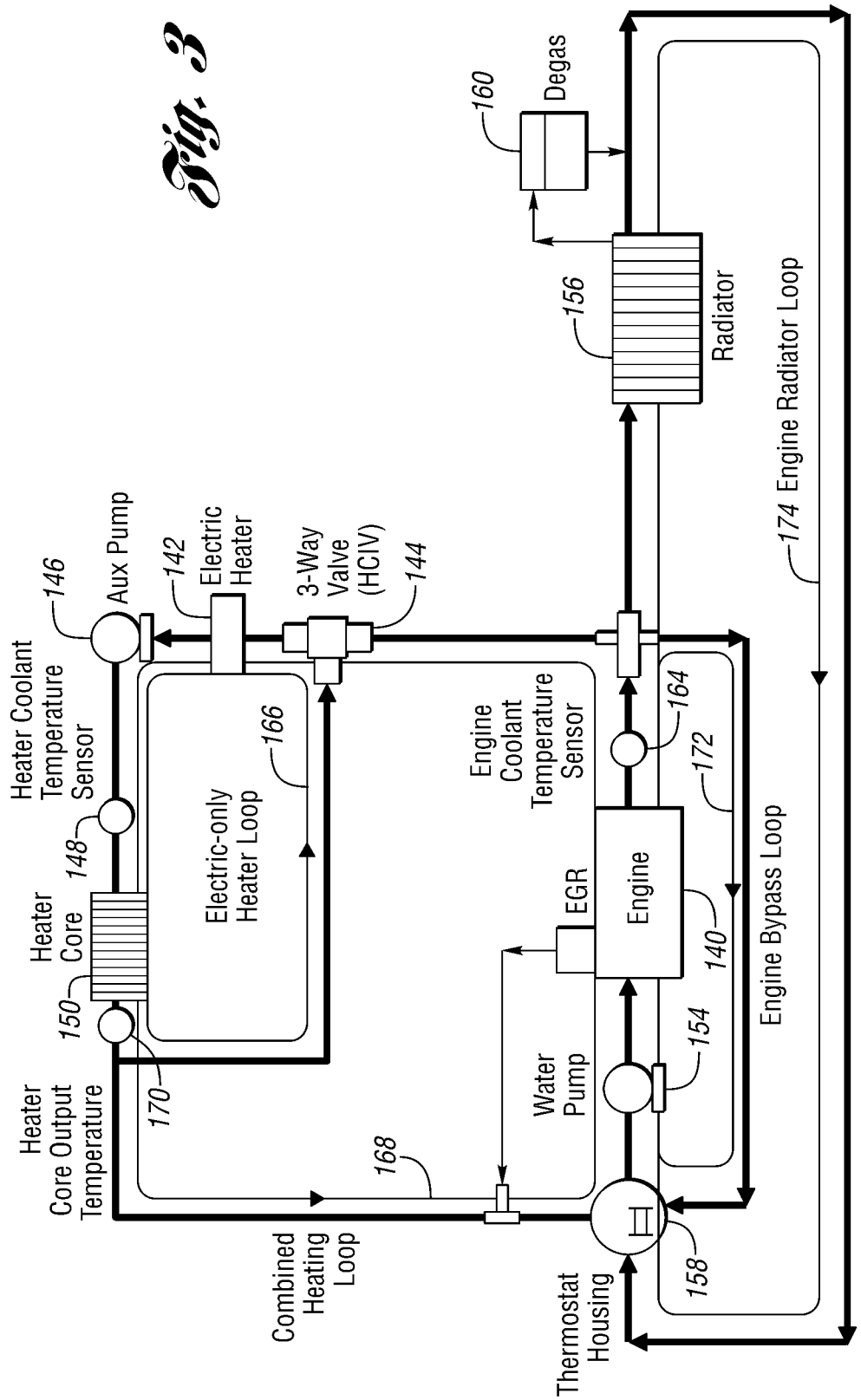

A system having multiple coolant paths may allow coolant heating to be handled differently depending on operating conditions. Referring to FIG. 3, the system has multiple distinct coolant paths. The electric-only heating loop (EOHL) 166 consists of an electric heater 142, an auxiliary water pump (AWP) 146, an engine coolant temperature (ECT) sensor 148 and a heater core 150. In the EOHL 166, the electric heater 142 heats the coolant. The auxiliary water pump 146 forces the coolant to flow through the heater core 150 and the electric heater 142. The temperature sensor 148 measures the coolant temperature in the EOHL 166 so that control and monitoring functions can be performed. The EOHL 166 may run independently of the engine 140 and the engine-radiator loop 174.

The engine-radiator loop (ERL) 174 provides cooling for the engine 140. The engine-radiator loop 174 may consist of conventional engine cooling components. A water pump 154 may force coolant to flow through the ERL 174. A thermostat 158 may regulate the flow of coolant into the engine 140 based on the coolant temperature. The coolant may flow through a radiator 156 to dissipate the heat from the coolant. The system may include a degas bottle 160 to remove air from the coolant system. The thermostat 158 will not allow coolant flow from the radiator 156 to the engine 140 when the coolant temperature is below a certain threshold. As the engine 140 runs, the coolant in the engine 140 will increase in temperature. At a certain temperature, the thermostat 158 will open and allow coolant to flow from the radiator 156 to the engine 140. Coolant may flow through the engine-bypass loop 172 instead of through the radiator 156 when the thermostat 158 is closed. For coolant to flow, one of the water pumps, 146 or 154, must be activated to force the coolant to flow through the system. When the thermostat 158 is open, the coolant flows through the radiator 156 where the coolant temperature decreases as heat is dissipated in the radiator 156. The cooled fluid then flows back into the engine 140 and the process is repeated. Engine coolant temperature 164 may be measured for control and monitoring purposes.

The ERL 174 and the EOHL 166 may be run independently from one another. Separate coolant temperatures may be achieved in each loop depending on the heating/cooling requirements of each loop at a particular time. The addition of the Heater Core Isolation Valve (HCIV) 144 allows the coolant flow to be modified. The HCIV 144 may be an electrically switched valve that alters the flow of coolant through the system. The HCIV 144 may be a three-way valve that allows one port to be alternately connected to each of the other two ports based on an activation signal. The HCIV 144 may allow the coolant loops to be combined as one larger coolant loop. The HCIV 144 may be switched in such a way to allow coolant to flow from the engine 140 outlet to the electric heater 142 input forming a combined heating loop (CHL) 168.

The CHL 168 allows both the engine 140 and the electric heater 142 to heat the coolant. Either the water pump 154 or the auxiliary water pump 146 may force coolant to flow through the engine 140. When the engine 140 is running, heat from the engine 140 is transferred to the coolant running through the engine 140. The engine coolant may then run through the HCIV 144 and through the electric heater 142, the auxiliary water pump 146 and the heater core 150. Coolant may return to the engine 140 via the thermostat 158 housing.

The system has the capability to operate in several different modes based on the availability of multiple coolant loops. For example in one mode, the vehicle is run solely on electric power. In this mode, an electric heater 142 may heat the coolant so that the engine 140 does not have to run. The HCIV 144 may be placed in a mode such that coolant is circulated in the electric only heating loop 166.

In this mode, the auxiliary water pump 146 forces coolant to flow through the heater core 150. The electric heater 142 may heat the coolant flowing through the loop as needed. Temperature is measured with a temperature sensor 148. In addition, no coolant from the engine 140 flows through the heater core 150. Coolant temperature may be controlled by varying the power output of the electric heater 142. Variables such as ambient temperature, passenger desired temperature, and blower fan speed may be used for adjusting the electric heater output power. One of the advantages of this arrangement is that coolant does not have to flow through the engine 140. If the engine 140 is not running, the engine block may be cooler than the desired coolant temperature. Running coolant through the engine block in this condition may cause the coolant to dissipate heat through the engine block—that is, heating up the engine block while decreasing the temperature of the coolant. The net effect may be that the electric heater 142 cannot provide enough heat to overcome the dissipation in the engine block. By isolating the engine 140 from the heating loop, the electric heater 142 can provide enough heat to maintain the desired coolant temperature because it is only heating the coolant flowing in the electric only heating loop 166.

In another embodiment, one mode of controlling the operation of the system may be referred to as Opportunistic Heating Mode (OHM). In this mode, the electric heater 142 may be used as the main coolant-heating source. Heat from the engine 140 may be used opportunistically when available. In this mode, the engine 140 is not requested to run for climate purposes. When the engine 140 is running, it may be desired to use the engine heat to warm the coolant. Since the coolant is warmed from the engine, it may be more efficient to use this heated coolant rather than using battery energy to heat the coolant with the electric heater 142. The contribution of the electric heater 142 to the coolant heating may be varied based on the temperature of the coolant 164 coming from the engine 140. In this mode, the controller may control the HCIV 144 to select the coolant source with the highest temperature. Depending on the current operating conditions, the controller may select between the electric heater 142 and the engine 140 as the source of heated coolant.

In OHM, the controller may select the loop to operate in based on the coolant temperatures in each loop. One condition for switching between loops may be to determine which loop may provide the highest temperature coolant to the electric heater 142. The system may determine the temperature of coolant exiting the heater core 150 with a temperature sensor 170 or estimation based on a model. This temperature may then be compared to the estimated or measured temperature 164 of coolant exiting the engine. The controller may then select the maximum of these temperatures to determine which loop the heating system should be operating in. Using the maximum of the temperatures can reduce the energy required by the electric heater 142 to further heat the coolant.

Running in the combined heating loop 168 during Opportunistic Heating Mode may only be available when the engine 140 is running. In this mode, there may be no need to supplement the coolant heating with the electric coolant heater 142. If the temperature of coolant from the engine 140 is warm enough, the system may not need to use the electric heater 142. In OHM, the controller may not request that the engine 140 be turned on if it is currently turned off. In OHM, the system may remain in the combined heating loop for some time after the engine 140 has turned off.

The operation in OHM may typically begin in the electric-only heating loop 166 with heat provided by the electric heater 142. If the engine coolant temperature 164 is greater than the heater core output temperature 170, the combined heating loop may be activated. After the transition to the combined heating loop, the electric heater output power may be limited. The decision to limit the electric heater output power may depend on if the engine is running or if the vehicle is in a charge sustaining mode. The system may determine a coolant target temperature based on the heating demands of the vehicle occupants. When the engine coolant temperature 164 exceeds the coolant target temperature, the electric heater 142 may not be required for heating. When the engine coolant temperature 164 falls below the heater core output temperature 170, the system may transition back to the electric-only heating loop 166. Hysteresis may be provided to prevent excessive cycling between the modes. The electric heater may also supplement the heat generated by the engine.

In OHM, the system may continue operating when certain faults are present. Various quantities may be measured by the controller or communicated by other controllers. When the coolant target temperature is missing or unknown, the controller may generate its own coolant target temperature. If blower airflow is missing or not available, the system may default to a maximum airflow setting. If cabin temperature is missing or not available, a default cabin temperature calibration may be used. If ambient air temperature is missing or not available, the system may infer an ambient air temperature.

Another possible mode of operation may be Forced Hybrid Heating Mode (FHHM). FHHM may use both the engine 140 and the electric heater 142 to heat the coolant. The coolant heats up as it flows through the engine 140 and the electric heater 142 may add additional heat to the coolant. This mode may be entered when heat dissipation in the heater core 150 is greater than the heat output of the electric heater 142. That is, the electric heater 142 is not able to keep up with heat demand from the heater core 150. In this situation, the electric heater 142 may not be able to heat the coolant to a sufficient temperature to meet the heating requirement of the passenger compartment.

Estimating or measuring the coolant temperature 170 at the heater core 150 output may be used to help determine this situation. Also, information regarding the electric heater 142 capability may also be used. The actual or estimated coolant temperature at the engine outlet 164 may also be used to determine how to operate in this mode. Once the system determines that the electric heater 142 is not able to meet the demand from the heater core 150, the system may request that the engine 140 be started to provide heated coolant. This mode may occur more frequently during extreme cold weather conditions. It may be necessary to override any driver-selected modes, such as electric only, in order to provide the desired level of heating in the passenger compartment.

In the Forced Hybrid Heating Mode, the engine 140 may be started and stopped as required by the heating demand. The engine 140 may be started and the combined heating loop 168 may be selected. As the engine 140 runs, the coolant temperature will rise. When the coolant temperature has exceeded a coolant target temperature by a certain amount, the engine 140 may no longer be required for coolant heating. The engine 140 may then be turned off. The HCIV 144 may remain in the combined heating loop until the engine coolant temperature 164 has dropped below the heater core output temperature 170. When the engine coolant temperature 164 has dropped below the heater core output temperature 170, the HCIV 144 may be switched to the electric-only heating loop 166. Once the engine 140 is turned off, the electric heater 142 may be used to keep the coolant temperature at the desired heater core coolant temperature. If the electric heater 142 cannot maintain the coolant temperature at the desired heater core coolant temperature, the engine 140 may be turned on again and the HCIV 44 may be switched to the combined heating loop 168. This may be repeated as necessary in order to maintain the temperature at the desired heater core coolant temperature.

FHHM may also be entered for certain faults within the heating system. When the HCIV 144, auxiliary water pump 146, electric heater 142 or coolant temperature sensor 148 stop working, it may be advantageous to use the combined heating loop.

If the electric heater 142 stops working, it may not be able to heat fluid in the electric heating loop 166. In this situation, it may be desirable to switch to the combined heating loop 168 by switching the HCIV 144 to the combined heating loop 168. This allows heated coolant from the engine 140 to flow through the heater core 150. This provides some redundancy as heating capability is not completely lost due to an electric heater 142 fault. In addition, the system may require that the engine 140 be running in order to generate heat.

In the event of an electric heater 142 fault, the Forced Hybrid Heating Mode may cycle the engine 140 on and off at a higher frequency. The engine 140 may be kept running to increase the coolant temperature above the desired heater core coolant temperature. Above the desired heater core coolant temperature, the engine 140 may be turned off. Once the engine 140 is turned off, the coolant temperature may begin decreasing and eventually fall below the desired heater core coolant temperature. If the electric heater 142 cannot provide heat to the coolant, the coolant temperature will decrease at a faster rate. Because of this, the engine 140 may be required to turn on sooner. Information regarding the electric heater 142 fault may be known and used by the system to alter the operation. The system may choose to activate different heating loops via the HCIV 144 if the electric heater 142 has stopped working.

If the auxiliary water pump 146 fails, it may not be able to move fluid through the electric-only heating loop 166. In such a situation, it may be desirable to switch to the combined heating loop 168 by switching the HCIV 144. This way, the water pump 154 may be utilized to pump fluid through both the engine radiator 156 and electric heater 166 loops. The water pump 154 may require information about auxiliary water pump 146 faults so that the speed of the water pump 154 may be increased to compensate for the faulted auxiliary water pump 146.

If the coolant temperature sensor 148 in the heater loop stops working, the system may not know the temperature in the electric heating loop 166. In this situation, the system may run in the electric-only heating loop 166 with the electric heater 142 at a predetermined maximum heating capability. The system may be placed in an open loop control mode since feedback is not available from the temperature sensor 148. The system may also be switched to the combined heating loop 168 and the engine temperature sensor measurement 164 can be used.

If the HCIV 144 stops working, the fault detection may indicate the faulted position of the valve. The indicated position may be used and the system operated in that mode to the best of its capabilities. A warning lamp and diagnostic trouble code may be set to indicate the fault. Because of the fault, the heating system may not perform as desired.

The system may also incorporate a Cold Engine Lock Out (CELO) feature. A CELO feature may inhibit the blower fan operation until the coolant has reached a certain threshold. The system may request that the engine be turned on to assist in heating the coolant. Once the coolant has achieved a certain threshold, the blower fan speed can be increased to allow heated air to flow into the passenger compartment.

The auxiliary water pump 146 may be run whenever heating is required in the passenger compartment. If no heating is requested, the auxiliary water pump 146 may not need to be activated. Similarly, the water pump 154 in the engine-radiator loop 174 may only need to be activated when the engine 140 is running. The water pump 154 may also be required to be on when running in the combined heating loop 168.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    an engine;
    a coolant loop including an electric heater and a heater core;
    a valve configured to selectively direct coolant from the engine to the coolant loop; and
    a controller programmed to, in response to a heat demanded from the heater core being greater than a heat capability of the electric heater, operate the valve to direct coolant from the engine to the coolant loop and request the engine to run.

2. The vehicle of claim 1 wherein the controller is further programmed to operate the valve to direct coolant from the engine to the coolant loop according to a difference between a temperature associated with the engine and a temperature associated with the heater core.

3. The vehicle of claim 2 wherein the difference between the temperature associated with the engine and the temperature associated with the heater core is greater than a predetermined threshold.

4. The vehicle of claim 1 wherein the controller is further programmed to operate the electric heater to heat coolant according to a difference between a temperature associated with the engine and a temperature associated with the heater core.

5. A vehicle heating system comprising:
    a controller programmed to operate a valve to change from an isolation position in which the valve isolates coolant circulating through an electric heater and a heater core from coolant circulating through an engine to a non-isolation position in which the valve directs coolant from the engine to the electric heater and request the engine to run in response to a difference between a heat demanded from the heater core and a heat capability of the electric heater being greater than a threshold.

6. The vehicle heating system of claim 5 wherein the controller is further programmed to operate the valve to direct coolant from the engine to the heater core in response to the electric heater being inoperative.

7. The vehicle heating system of claim 5 wherein the controller is further programmed to operate the valve to direct coolant from the engine to the heater core in response to a pump configured to circulate coolant through the heater core being inoperative.

8. The vehicle heating system of claim 5 wherein the controller is further programmed to operate the valve to direct coolant from the engine to the heater core in response to a temperature sensor measuring the temperature associated with the heater core being inoperative.

9. The vehicle heating system of claim 5 wherein the controller is further programmed to operate the electric heater to heat the coolant circulating therethrough according to the difference between the temperature associated with the engine and the temperature associated with the heater core.

* * * * *